United States Patent [19]
Kempkes

[11] 3,813,536
[45] May 28, 1974

[54] VEHICLE EQUIPPED WITH A FLOODLIGHT INSTALLATION

[76] Inventor: Helmut Kempkes, Hermann-lons-strasse 19, 563 Remscheid/Brd, Germany

[22] Filed: Jan. 2, 1973

[21] Appl. No.: 319,979

[30] Foreign Application Priority Data
June 24, 1972 Germany.......................... 7223740

[52] U.S. Cl.................................. 240/67, 52/121
[51] Int. Cl............................................ F21v 21/14
[58] Field of Search.......... 240/3, 10.5, 67; 52/122, 52/121

[56] References Cited
UNITED STATES PATENTS
3,495,364  2/1970  DeBella............................ 240/3 X Primary Examiner—Samuel S. Matthews
Assistant Examiner—Richard A. Wintercorn

[57] ABSTRACT

A vehicle equipped with a floodlight installation, in which the floodlight installation is provided with an additional attachable and detachable part on the carrier mast for the lamps and the vehicle can be maintained for its other customary functions, for example as a fire truck, fire fighting ship or as a current generator trailer while at the same time providing a useful and low cost device for the lateral alignment of the floodlight installation.

9 Claims, 6 Drawing Figures

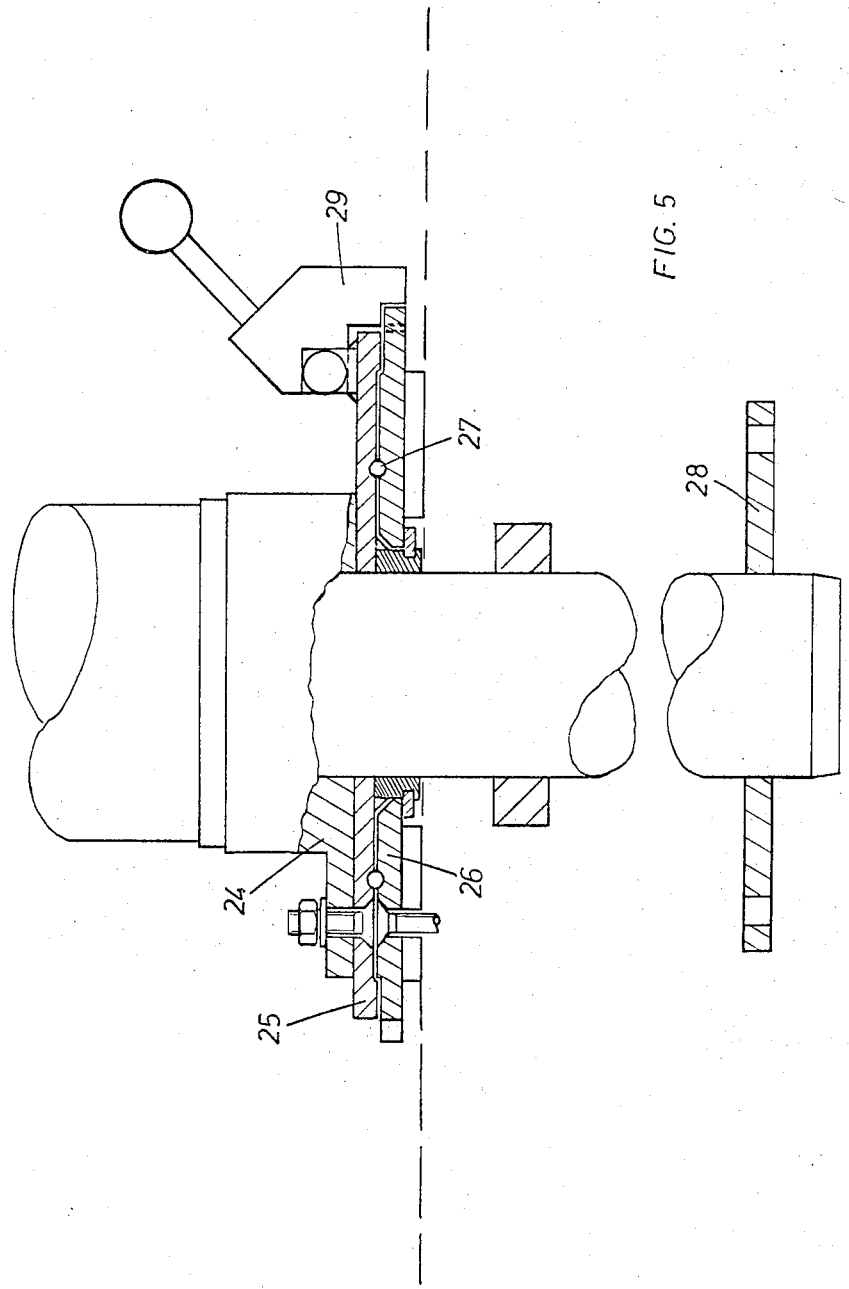

VEHICLE EQUIPPED WITH A FLOODLIGHT INSTALLATION

For use in catastrophies, but also for television pictures or for carrying out construction work at night, oftentimes vehicles are equipped with a floodlight installation in which the lamps are disposed on a telescoping, generally hydraulically extendable mast or pole carrying the lamps. The lamps, in this case, are mounted generally swivellable around the horizontal axes on the lamp carrier. The alignment of the floodlight illumination in a lateral direction can be accomplished in different ways. One way, for example, in which can be accomplished is by the proper driving and manoeuvering of the vehicle. Where the vehicle however, must be secured as a rule by special support legs, this manoeuvering is extremely troublesome and in case of uneven ground it is permissible to manoeuver the vehicle only with a retracted carrier mast. It is likewise known, to notatably mount the carrier mast around a perpendicular axis at the top of the head or top of the mast. In order to be able however, in this case to twist or turn the lamp carrier while the lamp carrier mast is extended, a particular turning drive is required at the upper end of the mast, as a result of which the weight that is to be born by the mast becomes relatively great and the costs of the floodlight installation become considerably higher. It has also been known already to dispose the entire floodlight installation and hydraulic installation on a special pedestal, which on its part is mounted rotatable around a perpendicular axis on the frame of the vehicle. However, this results in an expensive and special type vehicle, which is not widely used.

The invention is based on the objective of creating a vehicle equipped with a floodlight installation, in which the floodlight installation is provided with an additional attachable and detachable part on the carrier mast for the lamps and the vehicle can be maintained for its other customary functions, for example, as a fire truck, fire fighting ship or as a current generator trailer while at the same time providing a useful and low cost device for the lateral alignment of the floodlight installation.

According to the invention, this objective will be achieved by the fact that one thrust bearing and one radial bearing each are disposed in perpendicular alignment and in which bearings the mast of the lamp carrier is mounted so as to be rotatable around a perpendicular axis. According to the invention, the mast for the lamp carrier in this case can be attached on the side of the vehicle, for example, on the rear of the fire truck, whereby the thrust bearing is disposed avantageously below the radial ball bearing at the level of the vehicle frame.

Alternatively, the mast for the lamp carrier can also be inserted in the vehicle, for example, into a vessel such as a fire fighting ship, in which case the thrust bearing is disposed advantageously at the level of the deck.

According to further characteristics of the present invention, the mast for the lamp carrier can be torated manually from its zero position to every side by 180° each time until encountering certain stops. Furthermore, provision can be made, according to the invention, that a casing clamp be clamped on to the lowest part of the telescoping carrier mast, which is provided with one or more radially projecting control grips. The mast can be rotated comfortably by hand by means of these control grips, in so far as these control grips are of sufficient length or at lever arm length. Finally, according to the invention, an arresting device for the pertinent rotational position of lamp carrier has also been provided. This can consist of a casing clamp surrounding the mast of the lamp carrier, which is connected rigidly with the vehicle and can be tightened on the mast of the lamp carrier by means of an eccentric lever. Alternatively, provision can be made, that the arresting device comprise a latch mounted on the mast of the lamp carrier and operable by way of a hand lever, and that a peripherally toothed bearing disk, disposed on the side of the vehicle is assigned to the lug of the latch.

The invention will be described in more detail in the following pages on the basis of the drawing:

FIG. 5 shows an example for the mounting of a mast for the lamp carrier installed inside a vehicle, for example, a fire fighting ship.

Figure 1:
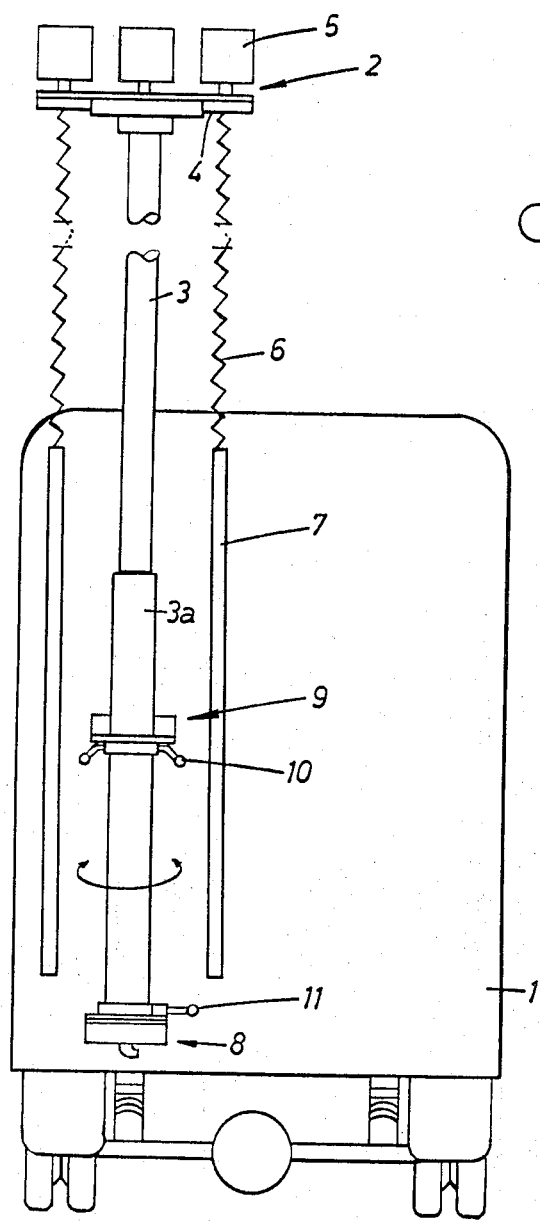
FIG. 1 shows a rear view of a fire truck on the rear of which a mast of the lamp carrier in the manner of the invention, has been disposed.

FIG. 1 shows a fire truck 1, on the rear end of which a floodlight installation 2 with telescopelike mast 3 of the lamp carrier, a lamp carrier 4 and lamps 5 are disposed. The power supply for the lamps 5 comes via cable 6, which are held by pipes 7 disposed on the rear wall of the vehicle 1 during retraction of the mast 3 for the lamp carrier.

The lowest part 3a of the telescope of the mast 3 of the lamp carrier is supported at its lower end by way of a thrust bearing 8 on a carrier plate attached to the vehicle frame furthermore and additionally, is guided in a radial bearing 9 lying in vertical alignment above it. The radial bearing 9 consists in the case of the embodiment, of an angular plate, in the horizontal leg of which a bearing opening for the mast element 3a has been recessed. Furthermore, one can recognize from FIG. 1 at the level of the radial bearing 9, control grips 10 for rotating the mast 3 for the lamp carrier around the perpendicular axis and furthermore, at the level of the thrust bearing 8, a handle 11 can be recognized for the arresting of the mast of the lamp carrier in the pertinent rotational adjustment.

Figure 2:
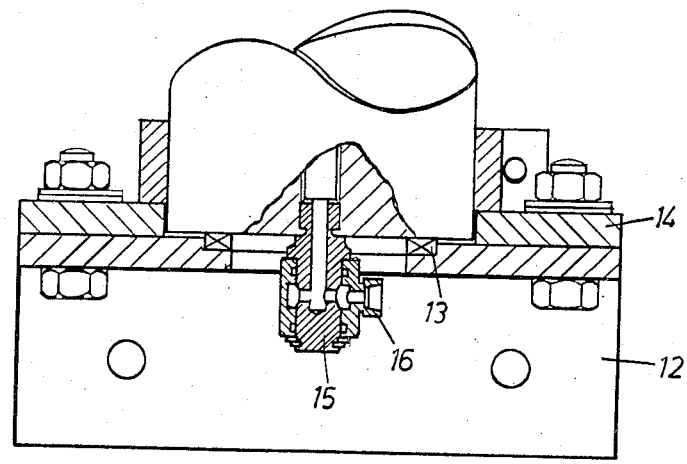
FIG. 2 shows the lower bearing place of the mast of the lamp carrier.

FIG. 2 shows the lower bearing site of the mast 3 for the lamp carrier. This lower bearing site comprises a bearing plate 12, attached rigidly to the vehicle frame, the lowest part 3a of the telescope of the mast for the lamp carrier being supported by said plate by way of an axial roller bearing 13. Furthermore a flange ring 14 is disposed on the bearing plate 12, which encases the lower end of the mast for the lamp carrier and guides it radially. The supply of pressure oil to the inside of the mast for the lamp carrier, is accomplished by way of a connecting member 15, screwed in to the lower front and of the mast for the lamp carrier, on the union 16 of which a hydraulic pipe (not shown) is connected.

Figure 3:
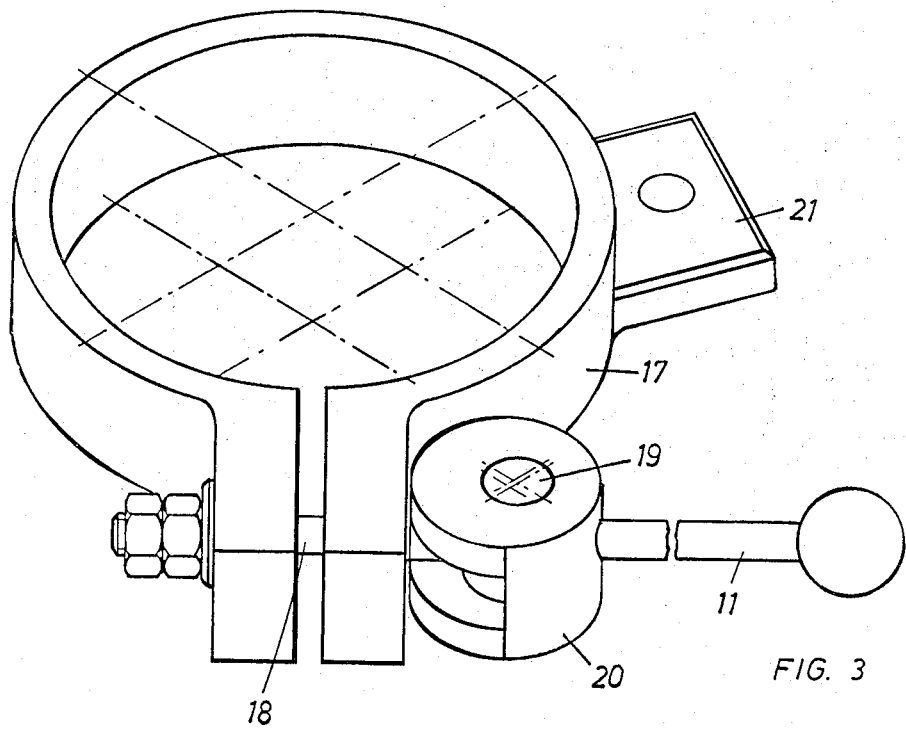
FIG. 3 shows an arresting device for the mast of the lamp carrier.

An arresting device (see also FIG. 3), is attached to the flange 14 which is constituted by a casting clamp 17 encasing the mast for the lamp carrier. The clamping stud 18 of the casing clamp carries at one end a perpendicularly directed-hinge pin 19, on which a clamping cylinder 20 is mounted eccentrically, which can be swivelled by means of the hand lever 11, whereby the casing clamp, is attached to the vehicle by way of screw-on lobes 21, and is also firmly braced with the mast.

Figure 4:
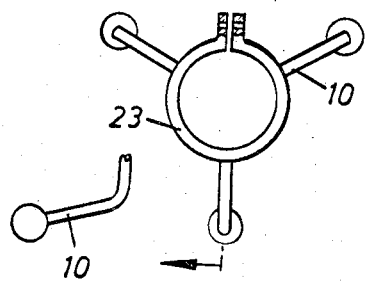
FIG. 4 shows a device for rotating the mast of the lamp carrier in top view.

Immediately below the upper radial bearing 9 a casing clamp 22 has been tightly clamped on the mast for the lamp carrier (see FIG. 4), which clamp is provided with several control grips 10.

After releasing the arresting device (see FIG. 4), the mast for the lamp carrier, even in its extended state, can easily be rotated manually by means of the control grips 10 to each side by 180°, after which it is arrested in the selected rotational position.

FIG. 5 illustrates schematically the mounting of the mast for the lamp carrier, in case of installation inside a vehicle, for example, inside a fire fighting ship. The mast for the lamp carrier has a flange 24 there, below which a bearing plate 25 has been screwed on. Below it lies a bearing disk 26 which is attached in some suitable manner on the roof of the vehicle or the deck of the ship. Between the two bearing plates 25 and 26 a thrust ball bearing 27 has been disposed. At the lower end, the mast for the lamp carrier is guided radially in a bearing plate 28, attached rigidly to the floor of the vehicle.

Figure 6:
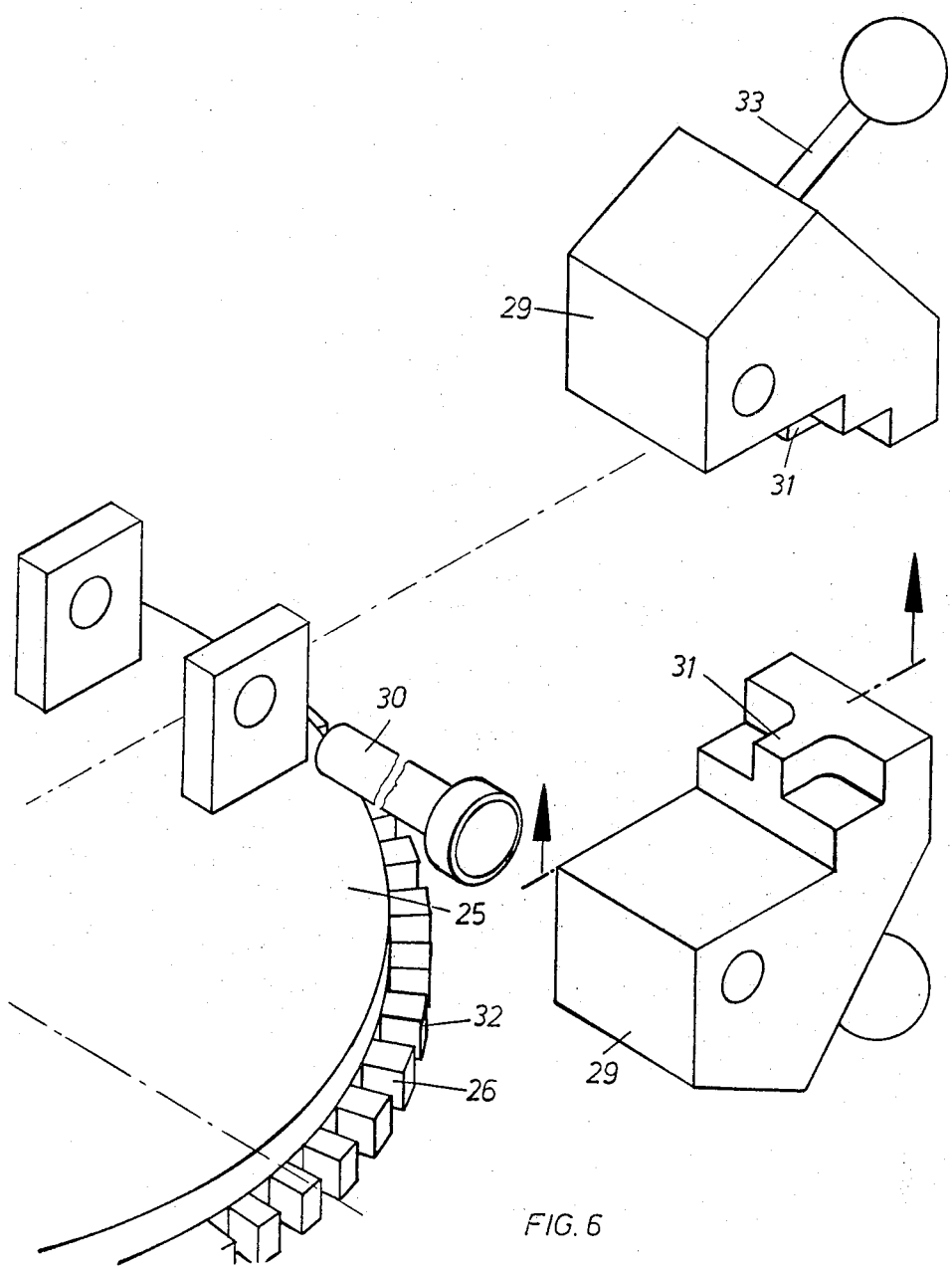
FIG. 6 is a rotating and arresting device of the embodiment according to FIG. 5.

A hatch 29 is mounted on the bearing plate 25, swivellable around an axis 30 (FIG. 6). The hatch 29 on its underside has a latch lug 31 to which the bearing disk 26, provided with a toothing 32 on its periphery, is assigned as a reception for the arresting member. The arresting member can easily be released by means of the hand lever 33, whereby the lever 33 can then be used as a rotating lever for rotating the mast for the lamp carrier.

What is claim is:

1. A vehicle equipped with a floodlight installation on which a mast for the lamp carrier is extendable in the manner of a telescope and is preferably extendable hydraulically comprising:
   attachment means for said mast and for said lamp carrier to laterally attached said mast to the vehicle;
   a thrust bearing and a radial bearing on said attachment means for perpendicular alignment of said mast to said vehicle;
   said thrust bearing and said radial bearing mounting said mast to be rotatable for lateral adjustment of the illuminating beam from the lamp on said lamp carrier.

2. A vehicle according to claim 1, wherein said thrust bearing is disposed below said radial bearing.

3. A vehicle according to claim 1, wherein the mast for the lamp carrier is installed in a fire fighting vehicle and the thrust bearing (27) is disposed above the radial bearing (28).

4. A vehicle according to claim 1, wherein the mast for the lamp carrier is manually rotatable to each side, each time by 180°, and stops are provided for each side.

5. A vehicle according to claim 1, wherein a casing clamp, is provided with one or more radially projecting control grips and clamping means for the casing are included which clamp on to the lowest part of the telescoping carrier mast.

6. A vehicle according to claim 1, including an arresting device for the predetermined rotational positioning of the mast for the lamp carrier.

7. A vehicle according to claim 6, wherein said arresting device consists of a casing clamp encompassing the mast for the lamp carrier, which clamp is rigidly connected with the vehicle and can be clamped firmly to the mast for the lamp carrier by means of an eccentric lever.

8. A vehicle according to claim 6, wherein said arresting device comprises a latch operable by way of hand lever and mounted on the mast for the lamp carrier, wherein a bearing disk with peripheral toothing is provided and is disposed on the vehicle side where a lug of the latch receives the arresting member.

9. A vehicle equipped with a floodlight installation on which a mast for the lamp carrier is extendable in the manner of a telescope and is preferably extendable hydraulically wherein the vehicle is a vessel having a deck comprising:
   attachment means for said mast and for said lamp carrier to install said mast in the area of the deck of the vehicle;
   a thrust bearing and a radial bearing on said attachment means for perpendicular alignment of said mast to said vehicle;
   said thrust bearing and said radial bearing mounting said mast to be rotatable for lateral adjustment of the illuminating beam from the lamp on said lamp carrier; and,
   said thrust bearing is disposed at the level of the deck and above the radial bearing.

* * * * *